US012631526B2

(12) United States Patent (10) Patent No.: US 12,631,526 B2

Teramoto et al. (45) Date of Patent: May 19, 2026

(54) TIRE STATE DETERMINATION SYSTEM, TIRE STATE DETERMINATION APPARATUS, TIRE STATE DETERMINATION METHOD, AND PROGRAM

(71) Applicant: Sumitomo Rubber Industries, Ltd., Kobe (JP)

(72) Inventors: Masaki Teramoto, Kobe (JP); Kazuharu Tanimura, Kobe (JP); Yukinori Hashimoto, Kobe (JP); Takahiro Nishimoto, Kobe (JP); Kenji Yoneda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 279 days.

(21) Appl. No.: 18/027,149

(22) PCT Filed: Jan. 20, 2022

(86) PCT No.: PCT/JP2022/001957
§ 371 (c)(1),
(2) Date: Mar. 20, 2023

(87) PCT Pub. No.: WO2022/215316
PCT Pub. Date: Oct. 13, 2022

(65) Prior Publication Data
US 2023/0332983 A1 Oct. 19, 2023

(30) Foreign Application Priority Data
Apr. 9, 2021 (JP) ................................. 2021-066444

(51) Int. Cl.
*G01M 17/02* (2006.01)

(52) U.S. Cl.
CPC ................................... *G01M 17/02* (2013.01)

(58) Field of Classification Search
CPC ............... B60C 23/0479; B60C 11/246; B60C 23/0408; B60C 11/02; B60C 23/04;
(Continued)

(56) References Cited

U.S. PATENT DOCUMENTS

| | | |
|---|---|---|
| 2014/0067193 A1 | 3/2014 | Gokyu et al. |
| 2019/0160886 A1 | 5/2019 | Tamura et al. |

(Continued)

FOREIGN PATENT DOCUMENTS

| | | |
|---|---|---|
| JP | 2002-131191 A | 5/2002 |
| JP | 2012-56445 A | 3/2012 |

(Continued)

OTHER PUBLICATIONS

International Search Report and Written Opinion mailed on Feb. 22, 2022, received for PCT Application PCT/JP2022/001957, filed on Jan. 20, 2022, 15 pages including English Translation.

*Primary Examiner* — Kristina M Deherrera
*Assistant Examiner* — Gedeon M Kidanu
(74) *Attorney, Agent, or Firm* — XSENSUS LLP

(57) ABSTRACT

A tire state determination system (100) acquires, from a vehicle (50), state data that includes various types of information that may exert influence on deterioration of a base body portion of a tire (1), and calculates an evaluation value S that indicates a state of the base body portion of the tire (1), based on the acquired state data. This allows an inspector who inspects an applicability to a base tire, to preliminarily grasp, as a material for determining whether it can be used as the base tire, the state of the base body portion of the tire.

12 Claims, 6 Drawing Sheets

(58) Field of Classification Search
      CPC .... B60C 23/0476; B60C 7/146; G06Q 10/20;
                 G06Q 50/40; G06Q 10/047; G06Q 10/10;
                 G06Q 30/0185; G06Q 30/0207; G06Q
                 30/0213; G06Q 30/0645; G01M 17/02;
                 G01M 17/027; G07C 5/006; G07C 5/008;
                 G01C 21/3461; G01C 21/3617; G01C
                 21/3697; G08G 1/096816; G08G
                 1/096844; G16Y 10/40; G16Y 20/20;
                                          G16Y 40/60
      See application file for complete search history.

(56)                    References Cited

U.S. PATENT DOCUMENTS

| | | | | |
|---|---|---|---|---|
| 2019/0265129 | A1* | 8/2019 | Tamura | B60C 11/246 |
| 2020/0148010 | A1* | 5/2020 | Oki | G06Q 10/00 |
| 2022/0080790 | A1 | 3/2022 | Alff | |

FOREIGN PATENT DOCUMENTS

| | | | |
|---|---|---|---|
| JP | 2012-116417 | A | 6/2012 |
| JP | 5347054 | B1 | 11/2013 |
| JP | 2016-223857 | A | 12/2016 |
| JP | 2017-1351 | A | 1/2017 |
| JP | 2017-218097 | A | 12/2017 |
| JP | 2017-219477 | A | 12/2017 |
| JP | 2019-67221 | A | 4/2019 |
| WO | 2020/128278 | A1 | 6/2020 |

* cited by examiner

TIRE STATE DETERMINATION SYSTEM, TIRE STATE DETERMINATION APPARATUS, TIRE STATE DETERMINATION METHOD, AND PROGRAM

CROSS-REFERENCE TO RELATED APPLICATIONS

The present application is a 371 of PCT filing PCT/JP2022/001957, filed Jan. 20, 2022, and claims priority from JP 2021-066444, filed Apr. 9, 2021, the entire contents of each are incorporated herein by reference.

TECHNICAL FIELD

The present disclosure relates to a tire state determination system capable of determining a state of a base body portion of a tire that is used for travelling of a vehicle.

BACKGROUND ART

Conventionally, there is known a retreaded tire that is obtained by replacing a tread portion of a tire whose first life was completed, with new tread rubber such that the function of the tire is restored (see PTL 1). The prevalence rate of the retreaded tire has increased in recent years since it is excellent in economical efficiency and friendly to the environment. The retreaded tire is also called a regenerated tire or a recycle tire.

The retreaded tire is manufactured by sticking the tread rubber to the base tire that was obtained by scraping off the tread portion from a tire, and vulcanizing it.

Meanwhile, all of the tires whose first life was completed are not necessarily applicable to the base tires, they are subjected to a strict inspection, and only those that have been determined as having sufficient durability are used as the base tires.

CITATION LIST

Patent Literature

[PTL 1] Japanese Patent Application Publication No. 2017-1351

SUMMARY OF THE INVENTION

Problems to be Solved by the Invention

However, to inspect the applicability to a base tire, it is necessary to pass through a primary inspection step such as a visual inspection or a touch inspection by an inspector, and a secondary inspection in which to detect whether or not a peeling-off, a crack, or a damage is present inside by performing a high-voltage inspection and a shearography inspection using supersonic. Such an inspection requires a large work load. In addition, when a tire received as a base tire has not passed the above-described inspection, the received tire needs to be discarded. The disposal requires a work load and a cost.

It is therefore an object of the present disclosure to provide a tire state determination system, a tire state determination apparatus, a tire state determination method, and a program that can reduce a load on the inspection of the applicability to the base tire.

Solution to the Problems

A tire state determination system according to an aspect of the present disclosure is configured to determine a state of a base body portion of a tire that is used for travelling of a vehicle, the base body portion corresponding to a base tire. The tire state determination system includes an acquisition portion configured to acquire tire-related information that may exert influence on deterioration of the base body portion, and a state determination portion configured to determine a state of the base body portion based on the tire-related information.

Since it is configured as described above, when an inspector uses the present system to inspect the applicability to a base tire for retreading, the inspector can preliminarily grasp the state of the base body portion of the tire as a material for determining whether it can be used as the base tire, before the inspector performs a primary inspection such as a visual inspection or a touch inspection, and a secondary inspection such as a high-voltage inspection or a shearography inspection. This makes it possible for the inspector to remove the tire in an inferior state from the inspection object, thereby reducing the load on the inspection and restricting a wasteful inspection cost.

In addition, when an owner of the vehicle uses the present system, the owner can preliminarily grasp the state of the base body portion of the tire attached to the vehicle.

Advantageous Effects of the Invention

According to the present disclosure, it is possible to reduce a load on the inspection of the applicability to the base tire.

DESCRIPTION OF EMBODIMENTS

The following describes an embodiment of the present disclosure with reference to the accompanying drawings. It should be noted that the following embodiment is an example of a specific embodiment of the present disclosure and should not limit the technical scope of the present disclosure.

Figure 1:
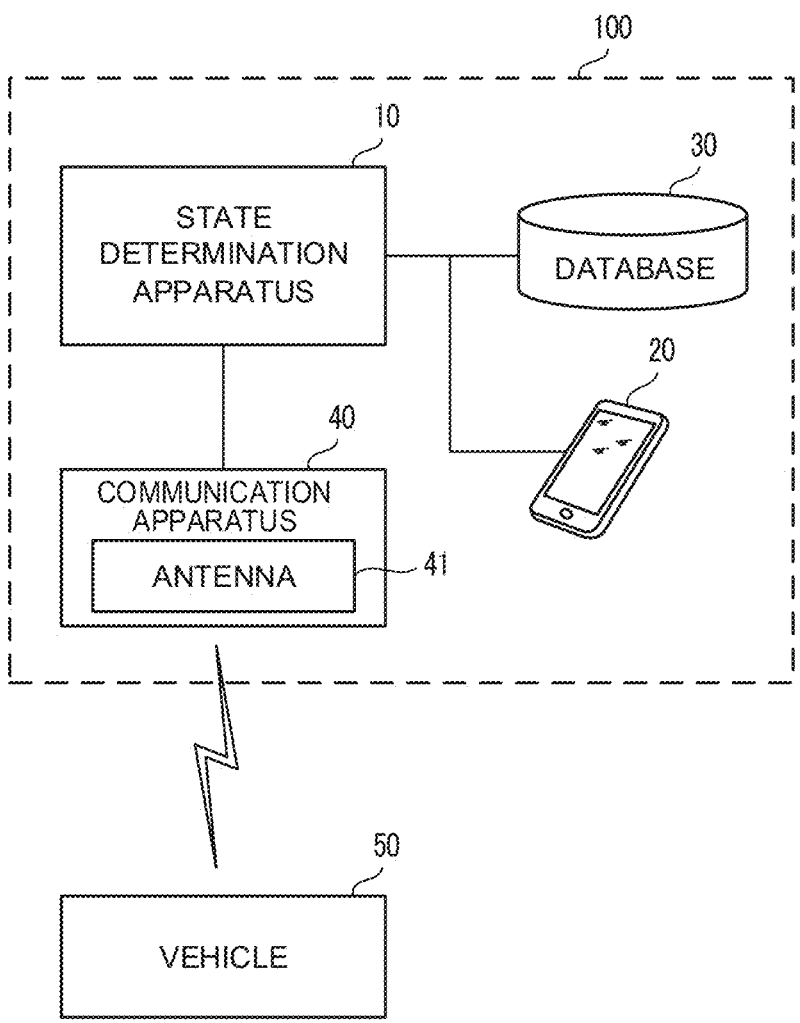
FIG. 1 is a block diagram showing a configuration of a tire state determination system.

FIG. 1 is a block diagram showing a configuration of a tire state determination system 100 (hereinafter merely referred to as a determination system 100) according to an embodiment of the present disclosure. The determination system 100 is an example of a tire state determination system of the present disclosure, and is configured to determine a state of a base body portion that corresponds to a base tire of a tire 1 that is used for travelling of a vehicle 50. Here, the tire 1 is what is called a pneumatic tire. In addition, the base tire is obtained by scraping off a predetermined amount of tread rubber from the tire 1 whose first life has been determined as having been completed because a slip sign had appeared on the surface thereof. The base tire is used as a base tire of a retreaded tire. The base body portion is a portion of the tire 1 that is used as the base tire, namely, a portion other than the scraped-off tread rubber.

[Configuration of Tire State Determination System 100]

As shown in FIG. 1, the determination system 100 includes a state determination apparatus 10 (an example of a tire state determination apparatus of the present disclosure), an information terminal 20, a database 30, and a communication apparatus 40 that are connected with each other by a wired or wireless communication network so as to be communicable with each other. The communication network is, for example, a wired communication network connected by a LAN or the like, or a wireless communication network using a dedicated line, a public line or the like.

The state determination apparatus 10 is an element constituting the determination system 100. The state determination apparatus 10 determines a state of the base body portion of the tire 1 by executing an applicability determination process (see FIG. 5) described below using: state data (an example of tire-related information of the present disclosure) transmitted from the vehicle 50, the state data being described below; and a predetermined calculation formula (see formula (1) described below), then determines based on the determination result whether or not it is usable as a base tire, and outputs the determination result to an external apparatus such as the information terminal 20.

The state determination apparatus 10 is an information processing apparatus or a server apparatus that can execute various calculation processes, and specifically is a computer, such as a server computer, a cloud server, or a personal computer, connected to the communication network. It is noted that the state determination apparatus 10 is not limited to a single computer, but may be a computer system in which a plurality of computers operate in association with each other, or a cloud computing system. In addition, various processes executed by the state determination apparatus 10 may be distributed to and executed by one or more processors. The state determination apparatus 10 is installed with a program or a computer software for operating the determination system 100.

The information terminal 20 is an information processing apparatus or a terminal apparatus used by: an owner of the tire 1 that is the determination object; or an inspection executor who performs an inspection of the state of the tire 1. The information terminal 20 is what is called a desktop personal computer or a notebook personal computer, or a human-carriable mobile terminal such as a smartphone or a tablet terminal. In addition, the information terminal 20 may be a vehicle-mounted terminal or a display device installed in the vehicle 50. In addition, in a case where the vehicle 50 is what is called a connected car that can function as an ICT terminal, the vehicle 50 itself may be regarded as the information terminal 20.

The information terminal 20 includes a display portion such as a liquid crystal display. Upon receiving a determination result output from the state determination apparatus 10, the information terminal 20 displays the determination result on a display screen of the display portion. Accordingly, the information terminal 20 is installed with a program or a computer software for transmitting various types of information to the state determination apparatus 10 in cooperation with the determination system 100, and displaying the determination result on the display screen.

The database 30 is a storage device, such as an HDD or an SSD, communicably connected with the communication network. The database 30 stores various types of data that are used in the determination system 100. The database 30 is configured as an external device, such as another server device or another storage device, that can perform data communications with the state determination apparatus 10. It is noted that the database 30 may be what is called a cloud storage that is connected via the Internet. In addition, the database 30 may be a storage device installed in the state determination apparatus 10, or an external storage device connected to the state determination apparatus 10 by a local network.

The communication apparatus 40 performs a communication with the vehicle 50 and receives the state data output from the vehicle 50, the state data being described below. Upon receiving the state data from the vehicle 50, the communication apparatus 40 transmits the received state data to the state determination apparatus 10. The communication apparatus 40 includes an antenna 41. The antenna 41 is used in a wireless communication performed with a communication portion 63 (see FIG. 3) that is included in a control unit 60 of the vehicle 50. When the vehicle 50 has entered a communication range defined by a predetermined wireless communication standard, the communication apparatus 40 can perform a wireless communication with the communication portion 63.

[Vehicle 50]

Figure 2:
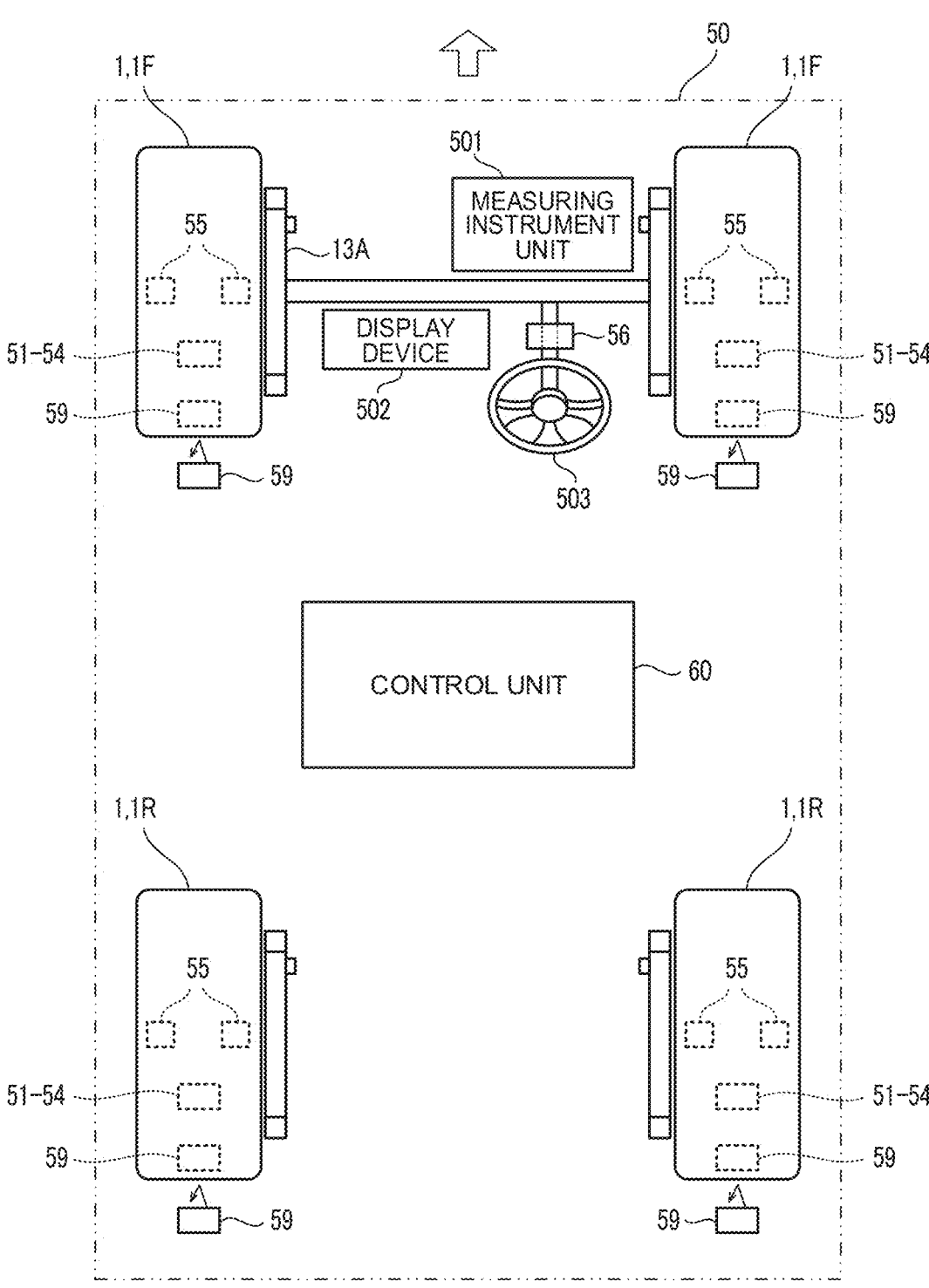
FIG. 2 is a schematic diagram showing an example of a vehicle.
Figure 3:
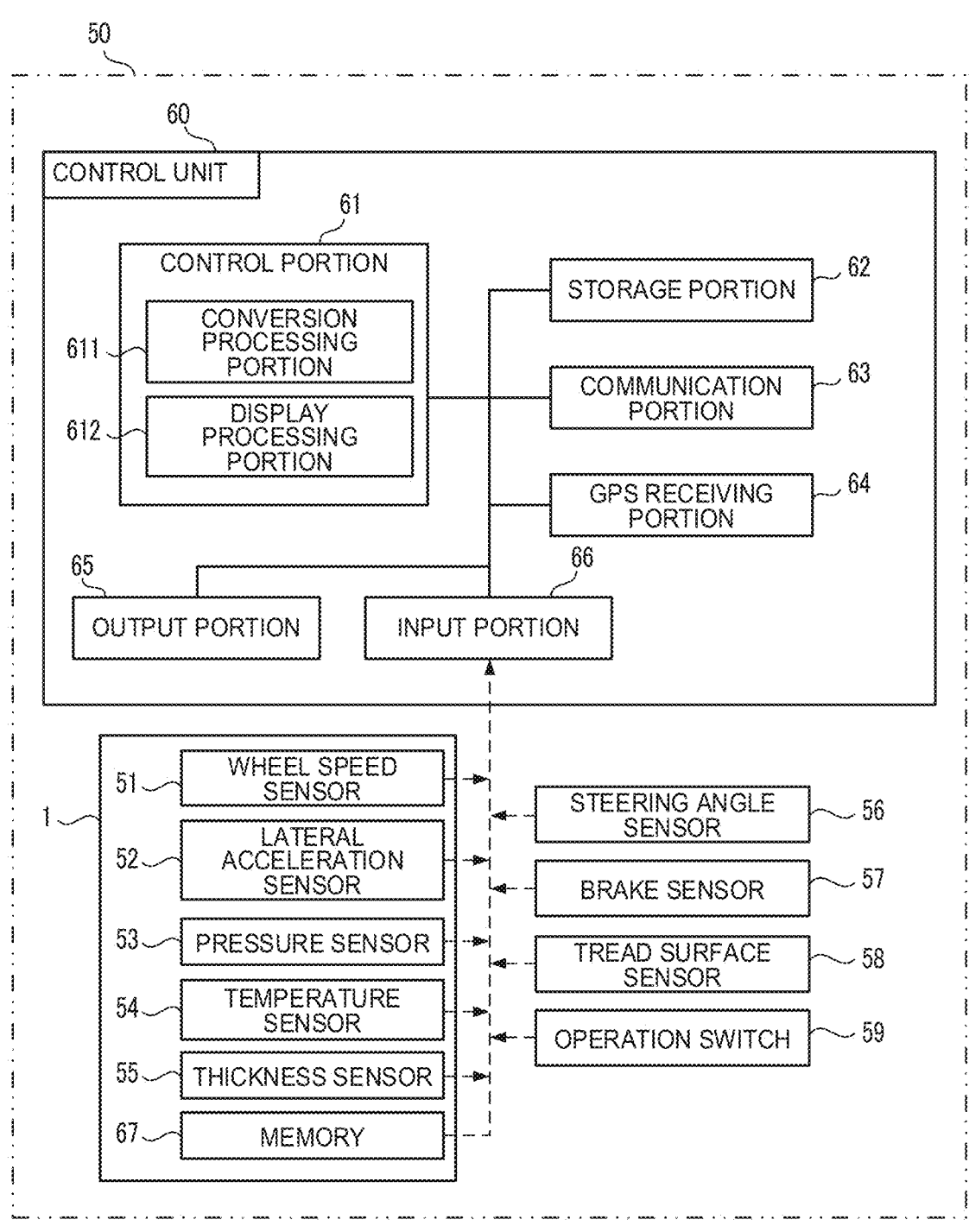
FIG. 3 is a block diagram showing a configuration of the vehicle.

The following describes the vehicle 50 to which the tire 1 has been attached, with reference to FIG. 2 and FIG. 3. Here, FIG. 2 is a schematic diagram showing an example of the vehicle 50. FIG. 3 is a block diagram showing a configuration of the vehicle 50.

As shown in FIG. 2, the vehicle 50 is, for example, a four-wheel passenger car including a total of four wheels at the front and the rear, the tire 1 attached to each of the wheels. In the present embodiment, the vehicle 50 is, for example, a front engine-front drive car (FF car), tires 1F attached to the front wheels are driving tires, and tires 1R attached to the rear wheels are driven tires. It is noted that the driving method and the steering method of the vehicle 50 are not limited to specific ones, the driving method of the vehicle 50 may be different from that of the FF car, and the steering method of the vehicle 50 may be different from the front wheel steering method.

In addition, the vehicle 50 is not limited to the four-wheel passenger car, but may be a passenger car with any number of wheels other than four, a large-sized vehicle such as a truck or a bus, a motorcycle, a racing vehicle, an industrial vehicle, a special vehicle, or a vehicle for loading such as a trailer or a carriage. In addition, the tire 1 is a pneumatic tire used for these various types of vehicles. It is noted that although a pneumatic tire is used as one example of the tire 1 attached to the vehicle 50 in the present embodiment, for example, the tire 1 can be the object of determination by the determination system 100 even when the tire 1 is any one of various types of tires, including a non-pneumatic tire that is not filled with compressed air, that contain, as a main component, a rubber component (rubber material) such as a natural rubber (NR) or SBR (styrene-butadiene rubber). In addition, the tire 1 only needs to contain, as a main component, a rubber component used in the tire industry, and the rubber component is not limited to a specific one.

As shown in FIG. 3, the vehicle 50 includes various types of sensors such as a wheel speed sensor 51, a lateral acceleration sensor 52, a pressure sensor 53, a temperature sensor 54, a thickness sensor 55, a steering angle sensor 56, a brake sensor 57, and a tread surface sensor 58. The sensors 51 to 55 are fixed to an inner space surface of the tire 1 via a mount member (not shown).

The wheel speed sensor 51 detects a wheel speed signal (rotation speed information) of the tire 1 during travelling. A control portion 61 of the control unit 60 calculates the number of rotations and the rotation speed of the tire 1 based on the wheel speed signal. The lateral acceleration sensor 52 detects an acceleration in the lateral direction (lateral-direction acceleration) applied to the tire 1 during travelling. The pressure sensor 53 detects an air pressure of air filled in the tire 1. The temperature sensor 54 detects a temperature of the tire 1. The thickness sensor 55 detects a thickness (a thickness from a band portion to the surface) of a tread portion of the tire 1. Two thickness sensors 55 are installed on the inner space surface of each tire 1, and are attached with a predetermined interval therebetween in a width direction of the tire 1. Each of the sensors 51 to 55 is connected to a transmitter (not shown) installed at the tire 1, and a detection value of each of the sensors 51 to 55 is transmitted to the control unit 60 via the transmitter. Each of the sensors 51 to 55 may have any configuration as far as it can output a detection value of the detection object or a signal indicating the detection value, and the attachment position and the detection method thereof are not limited to specific ones. It is noted that when each of the sensors 51 to 55 is connected to the control unit 60 in such a way as to communicate in a wireless or wired manner, the detection value may be transmitted individually from each of the sensors 51 to 55 to the control unit 60.

The steering angle sensor 56 detects a steering angle that is a rotation angle of a handle 503. For example, the steering angle sensor 56 is installed at a steering shaft of the handle 503. The steering angle sensor 56 is connected to the control unit 60 in such a way as to communicate in a wireless or wired manner, and the steering angle (detection value) detected by the steering angle sensor 56 is transmitted to the control unit 60. The steering angle sensor 56 may have any configuration as far as it can detect the steering angle of the handle 503, and the attachment position and the detection method thereof are not limited to specific ones.

The brake sensor 57, when the driver has performed a brake operation, detects whether or not the operation has been performed, and detects a step amount (operation amount). The brake sensor 57 is, for example, a rotary encoder or a potentiometer installed at a brake pedal. The brake sensor 57 is connected to the control unit 60 in such a way as to communicate in a wireless or wired manner, and whether or not the operation has been performed (detection value) and the step amount (detection value) detected by the brake sensor 57 is transmitted to the control unit 60. The brake sensor 57 may have any configuration as far as it can detect the detection value concerning the brake operation, and the attachment position and the detection method thereof are not limited to specific ones.

The tread surface sensor 58 detects whether or not there is a groove on the surface of the tread portion (tread surface) of the tire 1, and information for measuring the depth of the groove. The tread surface sensor 58 may be, for example, a scanning type optical distance sensor installed at an inner surface of a tire house of the vehicle 50. The optical distance sensor emits a laser beam to the tread surface to scan in the tire width direction, and measures the distance to the tread surface that is the detection object by emitting a reflection light reflected on the tread surface. In addition, the optical distance sensor generates and outputs trace data obtained by tracing the uneven shape of the tread surface in the width direction, allowing the control portion 61 of the control unit 60 to determine whether or not there is a groove on the tread portion and measure the depth of the groove based on the trace data. It is noted that a plurality of reflection type photo interrupters (also called photo reflectors) arranged on the inner surface of the tire house along the width direction may be applied instead of the optical distance sensor. In addition, a camera for picking up an image of the tread surface or a line sensor for detecting a shape in the tire width direction may be applied instead of the optical distance sensor.

In addition, the vehicle 50 is installed with an operation switch 59. The operation switch 59 is a switch member operated by a driver or the like, and when the operation switch 59 is operated, an operation signal thereof is transmitted to the control unit 60.

In addition, the tire 1 includes a memory 67 (an example of a storage portion of the present disclosure) in which identification information of the tire 1 is stored. The memory 67 is a nonvolatile storage device. The identification information only needs to be able to distinguish the tire 1 from other tires, and is an ID number assigned to each of the tires. In addition, the identification information may include a size, a manufacturing maker, a model number, a product name, and a manufacturing year/month/day of the tire 1. When the tire 1 is attached to the vehicle 50, the identification information is transmitted to the control unit 60 and is stored in a storage portion 62.

As shown in FIG. 3, the vehicle 50 includes the control unit 60 that comprehensively controls the vehicle 50. The control unit 60 is an information processing device configured to execute various calculation processes. The control unit 60 includes the control portion 61, the storage portion 62, the communication portion 63, a GPS receiving portion 64, an output portion 65, and an input portion 66.

The communication portion 63 is a communication interface for wirelessly connecting the control unit 60 to a predetermined communication network and executing a data communication with an external apparatus such as the communication apparatus 40 via the communication network according to a predetermined communication protocol.

The GPS receiving portion 64 acquires position information of the travelling position of the vehicle 50. The GPS receiving portion 64 detects the position of the vehicle 50 on the Earth by receiving a signal from a GPS satellite and performing a predetermined calculation process. The detected position information is transmitted to the control portion 61 to be used in a calculation process for identifying the travelling position or the travel route of the vehicle 50.

The storage portion 62 is a nonvolatile storage medium or storage device, such as a flash memory, for storing various types of information. For example, a control program for causing the control portion 61 to execute various processes is stored in the storage portion 62. The control program had been stored in an external storage apparatus, such as a server apparatus or an external storage, that can be communicably connected to the communication portion 63, and was read from the external storage apparatus and copied into the storage portion 62. Alternatively, the control program may be recorded in a non-transitory manner in a computer-readable recording medium such as a CD or a DVD, and may be read therefrom by a reader (not shown) electrically connected with the control unit 60 and copied into the storage portion 62.

In addition, the storage portion 62 stores detection values and data transmitted from each of the sensors 51 to 58, various types of information (the number of tire rotations, a travel speed, etc.) that have been obtained by conversion or generated based on the detection values and the data, information of the travel position (travel position information) of the vehicle 50 detected by the GPS receiving portion 64, and various types of information (moving route, etc.) that have been obtained by conversion or generated based on the travel position information.

The output portion 65 is an interface that outputs results of various processes executed by the control portion 61. For example, a measuring instrument unit 501 and a display device 502 installed in the vehicle 50 are connected to the output portion 65. For example, the control portion 61 outputs the speed information or the like to the measuring instrument unit 501, and outputs various types of information to the display device 502 in response to display requests from the driver or the like.

The input portion 66 is an interface that is connected in a wireless or wired manner to the various sensors 51 to 58 and the operation switch 59 installed in the vehicle 50. Signals output from the various sensors 51 to 58, the operation switch 59 and the like are input to the input portion 66.

The control portion 61 includes control equipment such as a CPU, a ROM, and a RAM. The CPU is a processor that executes various calculation processes. The ROM is a non-volatile memory in which control programs, such as BIOS and OS, for causing the CPU to execute various processes are preliminarily stored. The RAM is a volatile or nonvolatile memory for storing various types of information and is used as a temporary storage memory (working area) for the various processes executed by the CPU. The control portion 61 executes the applicability determination process described below by causing the CPU to execute the various control programs preliminarily stored in the ROM or the storage portion 42.

The control portion 61 includes various processing portions such as a conversion processing portion 611 and a display processing portion 612. The control portion 61 functions as the various processing portions when the CPU executes various processes in accordance with the various control programs. It is noted that a part or all of the processing portions included in the control portion 61 may be composed of an electronic circuit. In addition, processes described below executed by the conversion processing portion 611 may be executed by different processing portions. In addition, the control program may be a program for causing a plurality of processors to function as the various processing portions.

The conversion processing portion 611 performs a process to convert to state data related to detection values and data that have been input to the input portion 66 from the various sensors 51 to 58, based on the detection values and the data. In addition, the conversion processing portion 611 performs a process to generate state data related to the detection values and the data based on the detection value and the data. Here, the state data is an example of the tire-related information of the present disclosure, and includes, for example, the number of rotations of the tire 1 (tire rotation number), the travel speed of the vehicle 50, the acceleration of the vehicle 50, the lateral-direction acceleration applied to the tire 1, the air pressure of the tire 1 (tire air pressure), the temperature of the tire 1 (tire temperature), the groove depth of the tread portion of the tire 1, the wear amount of the tread portion of the tire 1, the uneven wear amount of the tread portion, the steering angle of the vehicle 50, the number of times of braking, and the brake step amount. These pieces of state data are information that may directly or indirectly exert influence on the deterioration of the base body portion of the tire 1 while the vehicle 50 is travelling.

The number of tire rotations, the travel speed, and the acceleration can be obtained by conversion or generated based on the detection value (wheel speed signal) of the wheel speed sensor 51. The lateral-direction acceleration can be obtained by conversion or generated based on the detection value of the lateral acceleration sensor 52. The tire air pressure can be obtained by conversion or generated based on the detection value of the pressure sensor 53. The tire temperature can be obtained by conversion or generated based on the detection value of the temperature sensor 54.

The groove depth of the tread portion can be obtained by conversion or generated based on the data output from the tread surface sensor 58.

The wear amount can be obtained by conversion or generated based on the detection value of the thickness sensor 55. The uneven wear amount indicates a degree of uneven wear of the tread portion of the tire 1. A specific example of the uneven wear amount is a difference in thickness between opposite ends of the tread portion in the width direction, and it can be obtained by conversion or generated based on a difference between detection values obtained by a pair of thickness sensors 55 installed on the inner space surface of the tire 1 separate from each other in the width direction.

It is noted that the uneven wear that occurs to the tire 1 includes what is called an unsymmetric wear (outer wear, inner wear), a both-shoulder wear, a center wear, a toe-in wear, a toe-out wear, a local wear, a corrugated wear, a pitted wear, and a sawtooth wear (heel and toe wear). A determination on whether or not any of these uneven wears is present, or a degree of the uneven wear (uneven wear amount) can be determined or measured by adjusting the number of thickness sensors 55 attached to the tire 1 or the disposal positions thereof as appropriate.

The steering angle can be obtained by conversion or generated based on the detection value of the steering angle sensor 56. The number of times of braking and the brake step amount can be obtained by conversion or generated based on the detection value of the brake sensor 57.

The state data including the above-described various types of information obtained by the conversion processing portion 611 is stored in the storage portion 62 for each piece of identification information of the tire 1. In addition, the state data stored in the storage portion 62 is transferred to and stored in the memory 67 of each tire 1, for example, at a timing when the vehicle 50 stops and key-off is performed. With this configuration, even when the tire 1 is removed from the vehicle 50 and attached to another vehicle 50 as a used tire, the state data of the tire 1 can be handed over to the other vehicle 50.

Among the state data, the number of tire rotations is accumulatively stored in the storage portion 62 as an accumulated number of rotations of the tire 1 during travelling of the vehicle 50. In addition, the travel speed is stored in the storage portion 62 as an average value of the travel speed (average speed) detected during travelling. The acceleration is accumulatively stored in the storage portion 62 as the number of times of occurrence of an excessive acceleration exceeding a predefined reference value. The lateral-direction acceleration is accumulatively stored in the storage portion 62 as the number of times of occurrence (occurrence frequency) of an excessive lateral-direction acceleration exceeding a predefined reference value (predetermined numerical value). As the tire temperature, an average value of the temperature (average temperature) detected during travelling is stored in the storage portion 62. The numerical values of the wear amount and the uneven wear amount are stored in the storage portion 62 as they are. The steering angle is accumulatively stored in the storage portion 62 as the number of times of occurrence of an excessive steering angle exceeding a predefined reference value (reference angle). The number of times of braking is accumulatively stored in the storage portion 62 as an accumulated number of times. The step amount is accumulatively stored in the storage portion 62 as the number of times of occurrence of an excessive step amount (excessive step amount) exceeding a predefined reference value.

These pieces of information (state data) stored in the storage portion 62 are information that may exert influence on the deterioration of the base body portion of the tire 1. That is, it is considered that the higher the numerical values of the above-mentioned pieces of information (the number of tire rotations, the average speed, etc.) are, the larger the load applied to the tire 1 is, promoting the deterioration or the wear of the base body portion. On the contrary, it is considered that the lower the numerical values of the above-mentioned pieces of information are, the smaller the load applied to the tire 1 is, the base body portion hardly deteriorating and hardly wearing. These pieces of information are used in the applicability determination process (see FIG. 5) described below.

In addition, with regard to the tire air pressure among the state data, an average value of pressure values detected during travelling (average air pressure) is stored in the storage portion 62. The average air pressure is information that may exert influence on the deterioration of the base body portion of the tire 1, and it is considered that the lower the numerical value is, the larger the load applied to the tire 1 is, promoting the deterioration or the wear of the base body portion. On the contrary, it is considered that the higher the numerical value of the average air pressure is, the smaller the load applied to the tire 1 is, the base body portion hardly deteriorating and hardly wearing. The average air pressure is used in the applicability determination process (see FIG. 5) described below.

In addition, with regard to the groove depth among the state data, the numerical value thereof is stored in the storage portion 62 as it is. The groove depth is information that may exert influence on the deterioration of the base body portion of the tire 1, and it is considered that the lower the numerical value is, the lower the grip performance of the tire 1 is, the larger the load applied to the tire 1 is, promoting the deterioration or the wear of the base body portion. On the contrary, it is considered that the higher the numerical value of the groove depth is, the higher the grip performance of the tire 1 is, the smaller the load applied to the tire 1 is, the base body portion hardly deteriorating and hardly wearing. The groove depth is used in the applicability determination process (see FIG. 5) described below.

It is noted that the tire temperature tends to increase when a heavy load is applied to the tire, namely, for example, when the vehicle 50 is travelling on a highway or a road with many curves. In addition, the tire temperature tends to be higher when tearing has occurred to an inner portion (for example, a carcass or a band) of the tire 1 that cannot be seen from outside, than when tearing has not occurred. It is considered that this is because when the tread portion of the tire 1 touches the ground with a tearing in the inner portion, the tire 1 is excessively deformed, and as the deformation and restoration to the state of not touching the ground are repeated, the tire temperature becomes higher than usual.

In addition, the conversion processing portion 611 performs, based on the position information of the vehicle 50 input from the GPS receiving portion 64 to the input portion 66, a process of generating a travel route of the vehicle 50 from the position information and a process of calculating the travel distance for each of travel routes. The travel route is included in the state data. For example, information of the travel route may be a travel distance for each type of travel route. Specifically, as the information of the travel route, a distance of a flat road travelled (flat road travel distance), a distance of a mountain road travelled (mountain road travel distance), a distance of an urban area travelled (urban area travel distance), and a distance of a highway travelled (highway travel distance) are accumulatively stored in the storage portion 62. These pieces of information, too, may exert influence on the deterioration of the base body portion of the tire 1. That is, it is considered that the higher the ratio of the mountain road travel distance and the highway travel distance to the total travel distance travelled by the tire 1 is, the larger the load applied to the tire 1 is, promoting the deterioration or the wear of the base body portion. On the contrary, it is considered that the higher the ratio of the flat road travel distance and the urban area travel distance is, the smaller the load applied to the tire 1 is, the base body portion hardly deteriorating and hardly wearing. These pieces of information of the travel distance are used in the applicability determination process (see FIG. 5) described below.

The display processing portion 612 performs a process to display various types of information on the display device 502. For example, upon receiving a result of the applicability determination process transmitted from the state determination apparatus 10, the display processing portion 612 displays the determination result on the display screen of the display device 502.

[Database 30]

The database 30 has a storage area assigned to a state data storage portion 31. The state data storage portion 31 stores the state data that was acquired by the state determination apparatus 10 from the vehicle 50, the state data being divided for each piece of identification information of the tire 1. With this configuration where a piece of identification information is assigned to the tire 1 and the state data is stored in the state data storage portion 31 for each piece of identification information, even when the tire 1 is removed from the vehicle 50 and attached to another vehicle 50 as a used tire, the state data can be handed over, and the state data can be updated to new state data.

[State Determination Apparatus 10]

Figure 4:
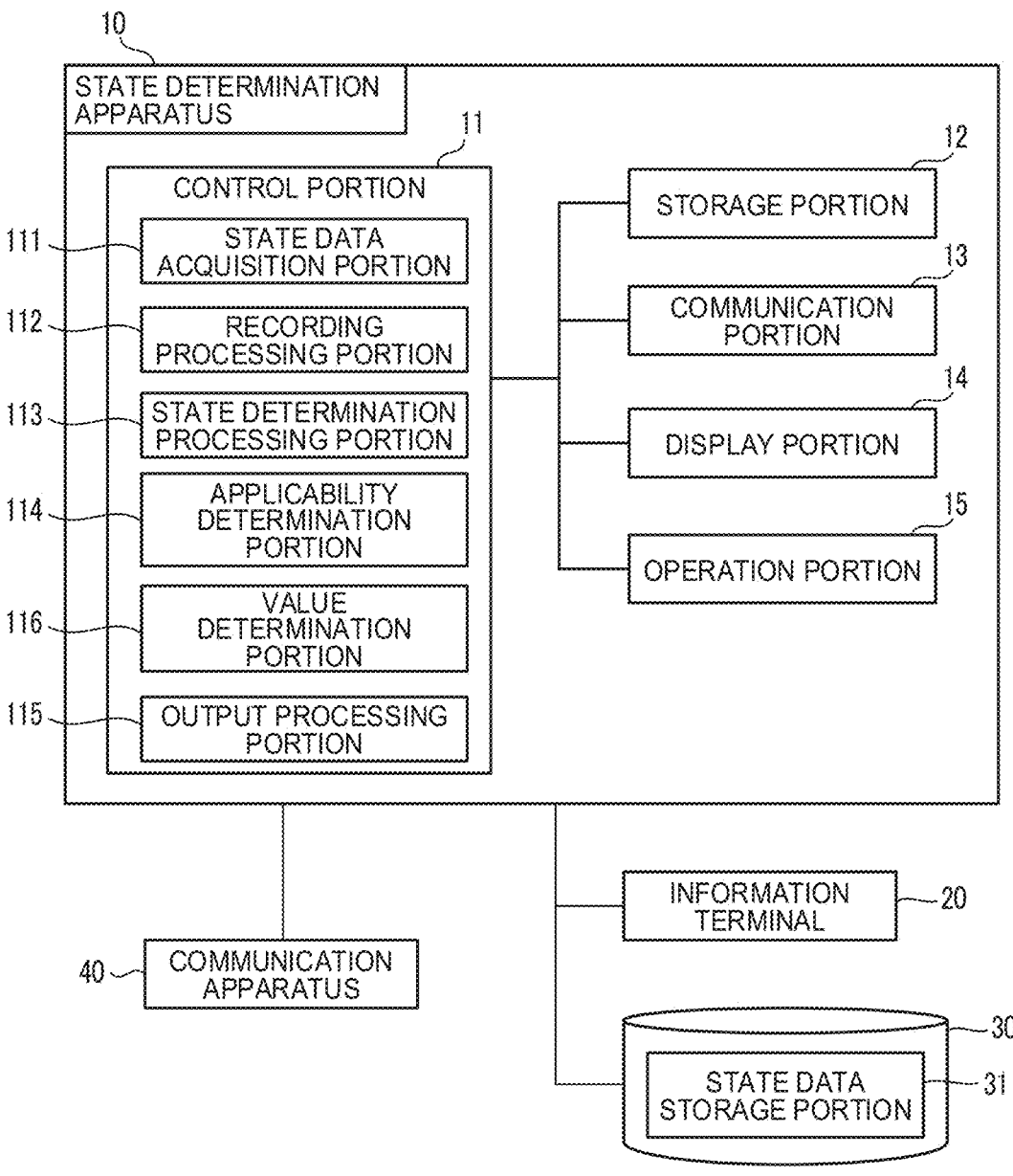
FIG. 4 is a block diagram showing a configuration of a state determination apparatus included in the tire state determination system.

The following describes a specific configuration of the state determination apparatus 10 with reference to FIG. 4. FIG. 4 is a block diagram showing the configuration of the state determination apparatus 10.

The state determination apparatus 10 is for realizing the determination system 100 of the present embodiment, and as shown in FIG. 4, includes a control portion 11, a storage portion 12, a communication portion 13, a display portion 14, and an operation portion 15.

The communication portion 13 is a communication interface for connecting the state determination apparatus 10 to the communication network and executing a data communication with the information terminal 20 and the database 30 connected to the communication network, according to a predetermined communication protocol.

The storage portion 12 is a nonvolatile storage medium such as an HDD or an SSD for storing various types of information. The storage portion 12 stores: a control program for causing the control portion 11 to execute various processes; data, a threshold, and a reference value used in various processes; and a calculation formula described below for calculating an evaluation value used in the applicability determination process described below.

The evaluation value is an index for determining the state of the base body portion of the tire 1 and is an index for determining whether or not the base body portion of the tire 1 is in a state of being able to be used as the base tire. When S denotes the evaluation value, $x_1$ denotes the tire rotation number, $x_2$ denotes the average speed, $x_3$ denotes the number of times of occurrence of the excessive acceleration, $x_4$ denotes the number of times of occurrence of the excessive lateral direction acceleration, $x_5$ denotes an inverse value of the average air pressure, $x_6$ denotes the average temperature, $x_7$ denotes the wear amount, $x_8$ denotes the uneven wear amount, $x_9$ denotes the number of times of occurrence of the excessive steering angle, $x_{10}$ denotes the number of times of braking, $x_{11}$ denotes the number of times of occurrence of the excessive step amount, $x_{12}$ denotes an inverse value of the groove depth of the tire 1, and $S_0$ denotes the evaluation value of a new tire 1 (hereinafter referred to as a reference evaluation value), the evaluation value S is calculated based on the following formula (1) using the above-mentioned each numerical value of the state data.

[Math 1]

$$S = S_0 - h\sum_{k=1}^{12} t_k X_k \qquad (1)$$

Here, the coefficient $t_k$ ($t_1$, $t_2$, $t_3$, . . . , $t_{12}$) in the formula (1) is a weight coefficient assigned to each numerical value $x_k$ ($t_1$, $t_2$, $t_3$, . . . , $t_{12}$) of the state data, and is a coefficient that is determined based on which of each numerical value $x_k$ is emphasized. In addition, the coefficient h is a weight coefficient that is applied in correspondence with the travel distance travelled with the tire 1. For example, when the ratio of the mountain road travel distance and the highway travel distance to the total travel distance is higher than a reference distance, the coefficient h is set to a numerical value larger than 1 (one) that is determined in correspondence with a difference (excessive amount) from the reference distance. When the coefficient h is applied, the evaluation value S is larger than when the coefficient h is not applied. In addition, when the ratio of the flat road travel distance and the urban area travel distance to the total travel distance is higher than a reference value, the coefficient h is set to a numerical value smaller than 1 (one) that is determined in correspondence with a difference (excessive amount) from the reference distance. In this case, the evaluation value S is smaller than when the coefficient h is not applied. It is noted that when the ratio of the mountain road travel distance and the highway travel distance to the total travel distance is lower than the reference distance and the ratio of the flat road travel distance and the urban area travel distance to the total travel distance is lower than the reference distance, the coefficient h is set to 1 (one).

As understood from the above-described formula, the evaluation value S is obtained by subtracting the sum total of the numerical value $t_k x_k$ from the reference evaluation value $S_0$. It is accordingly considered that the smaller the evaluation value S is, the larger the load applied to the tire 1 during travelling is, and there is a higher possibility that a peeling-off, a crack, or a damage has occurred to the base body portion of the tire 1. In addition, it is considered that the larger the evaluation value S is, the smaller the load applied to the tire 1 during travelling is, and there is a lower possibility that a peeling-off, a crack, or a damage has occurred to the base body portion of the tire 1. That is, the evaluation value S is an index indicating the degree of the state of the base body portion of the tire 1, a higher numerical value of the evaluation value S indicates a better state where the deterioration has not progressed, and a lower numerical value of the evaluation value S indicates a worse state where the deterioration has progressed.

The display portion 14 is a display device, such as a liquid crystal display, for displaying various types of information. The operation portion 15 is an input device, such as a mouse, a keyboard, or a touch panel, for receiving an operation of an operator.

The control portion 11 controls the state determination apparatus 10. The control portion 11 includes control equipment such as a CPU, a ROM, and a RAM. The CPU is a processor that executes various calculation processes. The ROM is a nonvolatile storage medium in which control programs, such as BIOS and OS, for causing the CPU to execute various processes are preliminarily stored. The RAM is a volatile or nonvolatile storage medium for storing various types of information and is used as a temporary storage memory (working area) for the various calculation processes executed by the CPU. The control portion 61 controls the state determination apparatus 10 by causing the CPU to execute the various control programs preliminarily stored in the ROM or the storage portion 12.

As shown in FIG. 4, the control portion 11 includes various types of processing portions including: a state data acquisition portion 111 (an example of an acquisition portion of the present disclosure); a recording processing portion 112 (an example of a recording portion of the present disclosure); a state determination processing portion 113 (an example of a state determination portion of the present disclosure); an applicability determination portion 114 (an example of a first determination portion of the present disclosure); a value determination portion 116 (an example of a second determination portion of the present disclosure); and an output processing portion 115. The control portion 11 functions as the above-described various processing portions when the CPU executes various calculation processes in accordance with the control programs. The control portion 11 or the CPU is an example of a computer or a processor that executes the control programs. It is noted that a part or all of the processing portions included in the control portion 11 may be composed of an electronic circuit. In addition, the control program may be a program for causing a plurality of processors to function as the various processing portions.

The state data acquisition portion 111 performs a process to acquire the state data that may exert influence on the deterioration of the base body portion of the tire 1. Specifically, when a communication between the communication apparatus 40 and the vehicle 50 is established, the control portion 11 performs the process to acquire the state data from the vehicle 50. In addition, the state data acquisition portion 111 performs a process to acquire the identification information of the tire 1 from the vehicle 50. In the present embodiment, the state data acquisition portion 111 transmits a data acquisition request to the vehicle 50. Upon receiving the data acquisition request, the control portion 61 of the vehicle 50, in response to the data acquisition request, reads identification information in the storage portion 62 and state data corresponding to the identification information, and transmits them to the state determination apparatus 10.

The recording processing portion 112 performs a process to record the state data acquired by the state data acquisition portion 111, onto the state data storage portion 31 (storage medium) of the database 30. Specifically, when state data corresponding to the identification information is not present in the state data storage portion 31, the recording processing portion 112 stores the state data, together with the identification information, in the state data storage portion 31 in linkage with the identification information. In addition, when state data corresponding to the identification information is present in the state data storage portion 31, the recording processing portion 112 updates the state data corresponding to the identification information to the state data acquired by the state data acquisition portion 111.

The state determination processing portion 113 performs a process to determine the state of the base body portion of the tire 1 based on the state data acquired by the state data acquisition portion 111. In the present embodiment, the state determination processing portion 113 calculates, as a determination result, the evaluation value S that indicates degree of the state of the base body portion of the tire 1 corresponding to the identification information, based on the state data. Specifically, the state determination processing portion 113 calculates the evaluation value S by applying each numerical value included in the state data and a predefined coefficient h, $t_k$ to the calculation formula indicated by the formula (1).

As described above, when the evaluation value S is smaller, there is a higher possibility that a peeling-off, a crack, or a damage has occurred to the base body portion of the tire 1, and when the evaluation value S is larger, there is a lower possibility that a peeling-off, a crack, or a damage has occurred to the base body portion of the tire 1. It can be said from this that the evaluation value S indicates the degree of the state of the base body portion of the tire 1, in other words, the evaluation value S is an index that indicates whether the state of the base body portion is superior or inferior.

The applicability determination portion 114 performs a process to determine whether or not the base body portion of the tire 1 is applicable to a base tire for retreading, based on the determination result of the state determination processing portion 113. In the present embodiment, when the evaluation value S is equal to or higher than a predetermined threshold, the applicability determination portion 114 determines that it is applicable to the base tire. In addition, when the evaluation value S is lower than the threshold, the applicability determination portion 114 determines that it is not applicable to the base tire.

A large number of tires 1 whose first life ended may be subjected to a conventional inspection, and the threshold may be set to the largest numerical value of the evaluation value S among those of tires 1 whose inspection result was determined as excellent, namely, tires 1 that were determined as applicable to the base tire.

The value determination portion 116 performs a process to determine a value of the tire 1 as a base tire, based on the determination result of the state determination processing portion 113. When the applicability determination portion 114 determines that the base body portion of a tire 1 is applicable to a base tire for retreading, the above-mentioned determination process is executed on the tire 1. In the present embodiment, the value determination portion 116 determines the value based on the evaluation value S calculated by the state determination processing portion 113.

The value determined by the value determination portion 116 may be, for example, a market value as a base tire, such as a buying price or a selling price. Alternatively, the value may be an index corresponding to price information such as the buying price or the selling price.

When the value is a market price, the value determination portion 116 can calculate it by multiplying the new article price of the tire 1 by a ratio corresponding to the evaluation value S. It is noted that new article prices of various types of tires 1 may be preliminarily stored in the storage portion 12 or the database 30, or may be acquired from sales sites managed by tire sales companies on the Internet.

In addition, when the value is the index, the value determination portion 116 may set a reference score of a new article tire 1 to 100 points, and calculate a relative score corresponding to the evaluation value S by multiplying the reference score by a ratio corresponding to the evaluation value.

The output processing portion 115 performs a process to output results of various processes executed in the determination system 100. In the present embodiment, the output processing portion 115 performs a process to output the evaluation value S calculated by the state determination processing portion 113, a determination result (whether or not applicable) of the applicability determination portion 114, or a determination result (evaluation as the base tire) of the value determination portion 116. In the present embodiment, the output processing portion 115 performs a process to display the evaluation value S and the determination result on the display portion 14. In addition, upon receiving a transfer request from the vehicle 50 or the information terminal 20, the output processing portion 115 may output the evaluation value S and the determination result, in response to the transfer request, to the vehicle 50 or the information terminal 20. In addition, upon receiving a transfer request from a sales site on the Internet or the like, the output processing portion 115 may output, in response to the transfer request, to the sales site that is a transfer source.

[Applicability Determination Process]

In the following, with reference to the flowchart of FIG. 5, a description is given of an example of the procedure of the applicability determination process executed in the determination system 100, as well as a tire state determination method of the present disclosure. In the following, a description is given of the applicability determination process executed by the control portion 11 of the state determination apparatus 10. Here, the applicability determination process includes: a process to calculate, as the evaluation value S, a determination result on the state of the base body portion of the tire 1 being the inspection object; and a process to determine, based on the evaluation value S, whether or not the base body portion is usable as the base tire.

Figure 5:
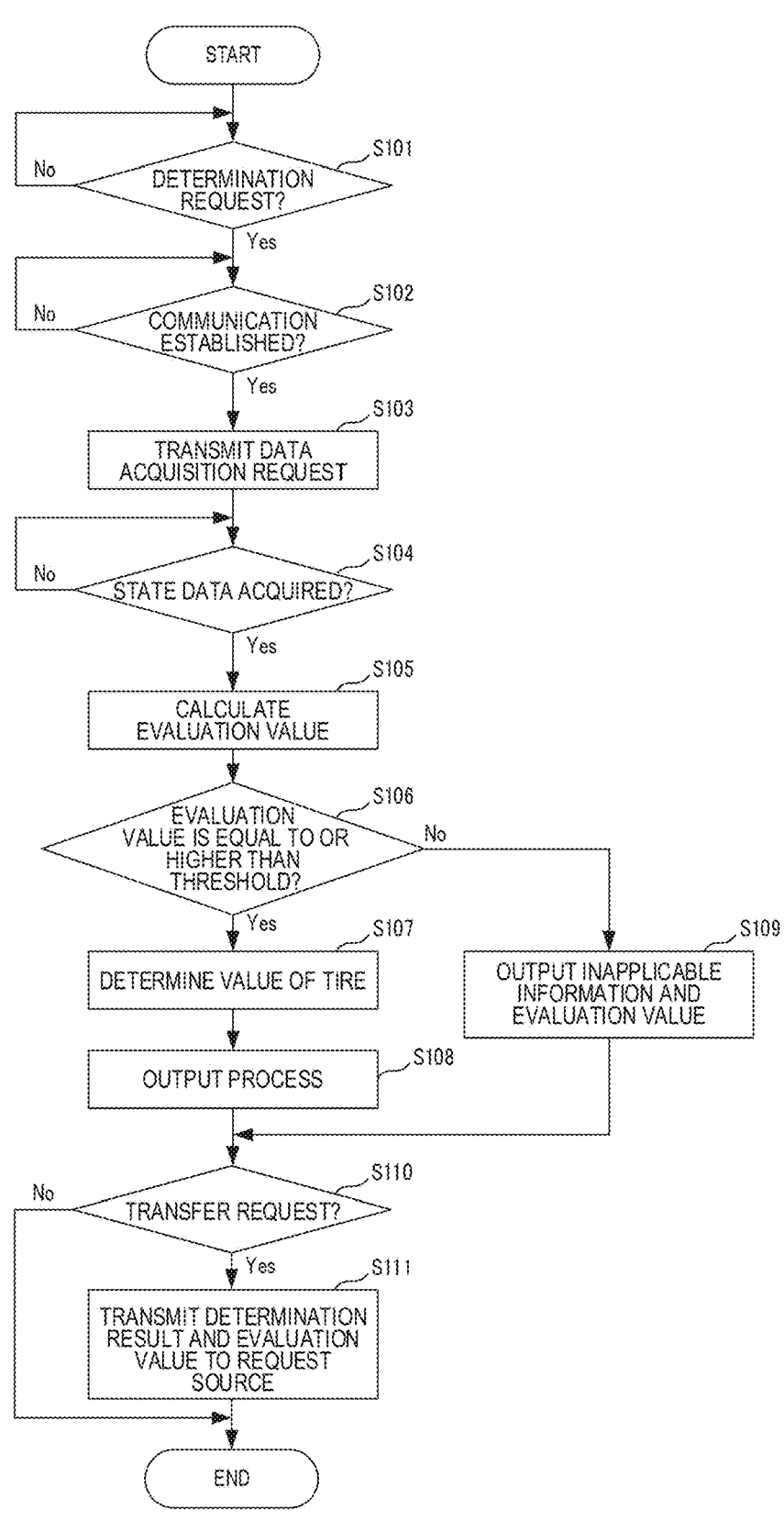
FIG. 5 is a flowchart showing an example of a procedure of an applicability determination process executed in the tire state determination system.

As shown in FIG. 5, in step S101, the control portion 11 of the state determination apparatus 10 determines whether or not a determination request has been input. Here, the determination request is a command signal that is input, via the operation portion 15, by a user who operates the state determination apparatus 10. It is noted that the determination request may be input from the information terminal 20 operated by the user to the state determination apparatus 10. In addition, the user who is riding on the vehicle 50 may operate a vehicle-mounted terminal to input it from the vehicle 50 to the state determination apparatus 10.

Upon receiving the determination request, the control portion 11 determines whether or not a communication between the communication apparatus 40 and the vehicle 50 is established (S102), and when a communication with the vehicle 50 is possible, transmits the data transfer request to the vehicle 50 (S103). The data transfer request is a command signal for requesting a transmission of the state data. Upon receiving the data transfer request, the control portion 61 of the vehicle 50 reads the identification information and the state data in the storage portion 62 and transmits them to the state determination apparatus 10. It is noted that steps S102 and S103 are an example of an acquisition step of the present disclosure.

Upon acquiring the identification information and the state data transmitted from the vehicle 50 in step S104, the control portion 11 performs a process to calculate the evaluation value S by using the calculation formula shown in the formula (1) and the state data (S105). It is noted that step S105 is an example of a state determination step of the present disclosure.

In the next step S106, the control portion 11 determines, based on the evaluation value S calculated in step S105, whether or not the base body portion of the tire 1 is usable as the base tire. Specifically, it determines whether or not the evaluation value S is equal to or higher than a predefined threshold. When the evaluation value S is equal to or higher than the threshold, the control portion 11 determines that the base body portion of the tire 1 is usable as the base tire (Yes at S106). In this case, in the next step S107, the control portion 11 determines the value of the tire 1 as a base tire. The value determined here is, for example, a buying price of the tire 1 as a base tire, or a score or a rank that indicates superiority or inferiority of the degree. Subsequently, the control portion 11 outputs, to the display portion 14, information of the value (value information), applicable information indicating that it is applicable, and the evaluation value S, and displays them on the display portion 14 (S108). On the other hand, when the evaluation value S is lower than the threshold, the control portion 11 determines that the base body portion of the tire 1 is inapplicable to the base tire (No at S106). In this case, the control portion 11 outputs inapplicable information indicating that it is inapplicable, and the evaluation value S to the display portion 14, and displays them on the display portion 14 (S109).

It is noted that when the request source of the determination request is the vehicle 50, the control portion 11 may transmit information such as the value information, the determination result, and the evaluation value S to the vehicle 50. In addition, when the request source of the determination request is the information terminal 20, the control portion 11 may transmit information such as the value information, the determination result, and the evaluation value S to the information terminal 20. In addition, when the request destination of the determination request is a sales site on the Internet or the like, the control portion 11 may transmit information such as the value information, the determination result, and the evaluation value S to the sales site that is the transfer source.

In addition, in a case where a transfer request that requests a transfer of the determination result and the evaluation value S, has been received (S110), the control portion 11 transmits information such as the value information, the determination result, and the evaluation value S to the request source of the transfer request (S111). This ends a series of processes. In addition, in a case where the transfer request has not been received, a series of processes ends after the output process of step S108 or step S109.

Figure 6:
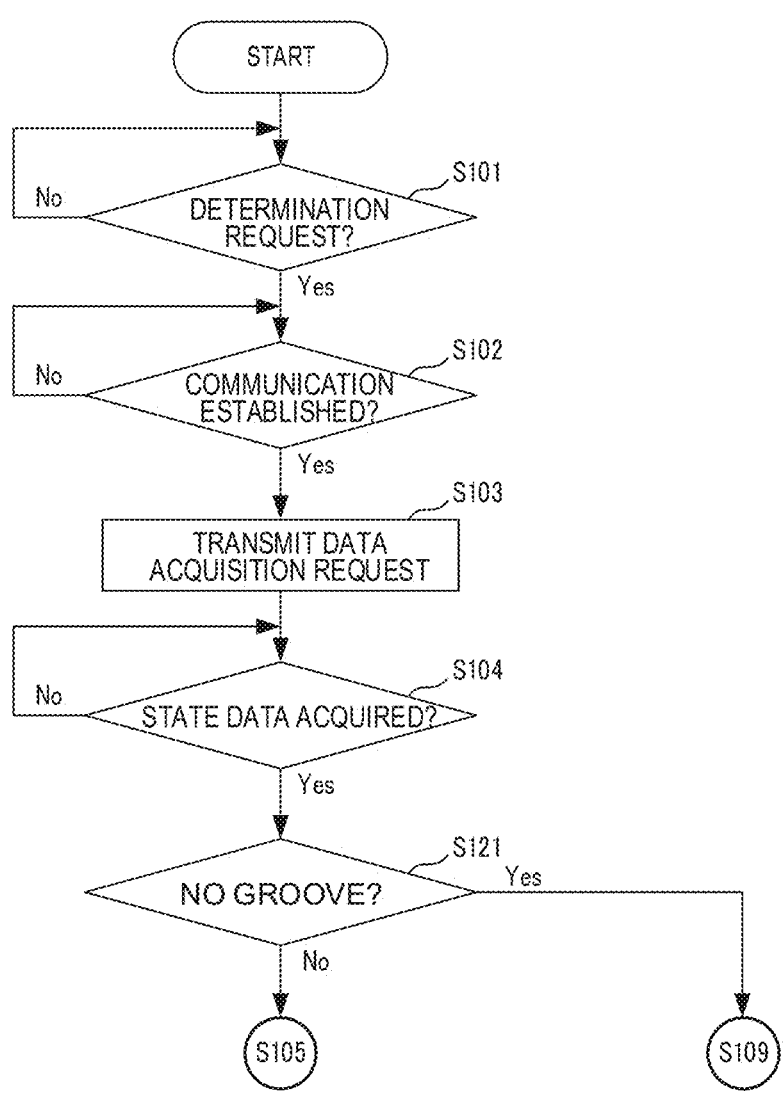
FIG. 6 is a flowchart showing another example of the procedure of the applicability determination process executed in the tire state determination system.

In another example of the applicability determination process executed in the determination system 100, each process may be executed in accordance with the procedure shown in the flowchart of FIG. 6. For example, processes of steps S101 to S103 are performed as described above, then after the identification information and the state data are acquired in the following step S104, the control portion 11 determines, in step S121, whether or not the tread portion of the tire 1 has a groove. The determination process of step S121 is performed based on the groove depth information included in the state data. Specifically, when the groove depth is zero or a numerical value that can be evaluated as zero, the control portion 11 determines that the tread portion of the tire 1 has no groove.

When the vehicle 50 travels in a state where the tread portion of the tire 1 has no groove, an excess load is applied to the tire 1, and it is highly possible that the base body portion of the tire 1 has been damaged. Accordingly, upon determining that the tread portion of the tire 1 has no groove, the control portion 11 determines that the base body portion of the tire 1 is inapplicable to the base tire and moves the process to step S109 (see FIG. 5), without performing the process of step S105 and subsequent processes. On the other hand, upon determining that the tread portion of the tire 1 has a groove, the control portion 11 moves the process to step S105 and performs the process of step S105 and subsequent processes.

It is noted that in a case where a camera for picking up an image of the tread surface of the tire 1 is installed at an inner surface of a tire house of the vehicle 50, the control portion 11, for example, may acquire image data of the image picked up by the camera together with the state data and determine, based on the image data, whether or not a foreign substance, such as a nail or a metal piece, is stuck in the tread portion of the tire 1. When such a foreign substance is stuck in the tread portion, the base body portion of the tire 1 is seriously damaged, and the base body portion of the tire 1 is inapplicable to the base tire. As a result, upon determining that a foreign substance is stuck in the tread portion of the tire 1, the control portion 11 may move the process to step S109 (see FIG. 5), without performing the process of step S105 and subsequent processes.

As described above, in the determination system 100 of the present embodiment, the evaluation value S that indicates the state of the base body portion is calculated based on the state data that includes various types of information that may exert influence on the deterioration of the base body portion of the tire 1. As a result, when an inspector uses the determination system 100 to inspect the applicability to a base tire for retreading, the inspector can preliminarily grasp the state (evaluation value S) of the base body portion of the tire 1 as a material for determining whether it can be used as the base tire, before the inspector performs a primary inspection such as a visual inspection or a touch inspection, and a secondary inspection such as a high-voltage inspection or a shearography inspection. With this configuration, the inspector can remove the tire 1 in an inferior state from the inspection object, thereby reducing the work load on the inspection and restricting a wasteful inspection cost.

In addition, when an owner of the vehicle 50 uses the determination system 100, the owner can preliminarily grasp the state of the base body portion of the tire 1 attached to the vehicle 50.

In addition, in the determination system 100, the applicability determination portion 114 determines whether or not the base body portion of the tire 1 is applicable to a base tire, based on the evaluation value S that is a determination result. This eliminates the need for the user using the system to determine, by him/herself, the applicability to the base tire.

In the above-described embodiment, a calculation example is described in which the state determination processing portion 113 calculates the evaluation value S by using the tire rotation number $x_1$, the average speed $x_2$, the number of times of occurrence of the excessive acceleration $x_3$, the number of times of occurrence of the excessive lateral direction acceleration $x_4$, the inverse value of the average air pressure $x_5$, the average temperature $x_6$, the wear amount $x_7$, the uneven wear amount $x_6$, the number of times of occurrence of the excessive steering angle $x_9$, the number of times of braking $x_{10}$, the number of times of occurrence of the excessive step amount the inverse value of the groove depth $x_{12}$, the coefficient $t_k$, the coefficient h, the reference evaluation value $S_0$, and the calculation formula of the formula (1). However, the present disclosure is not limited to the calculation example. For example, the evaluation value S may be calculated by using the reference evaluation value $S_0$ and one or more of each numerical value $x_k$ of the above-described items. In addition, a numerical value obtained by subtracting the sum total of each numerical value $x_k$ from the reference evaluation value $S_0$ without using the coefficient $t_k$ and the coefficient h may be set as the evaluation value S. In addition, an inverse value of the sum total of each numerical value $x_k$ may be set as the evaluation value S, without using the reference evaluation value $S_0$.

In addition, in a case where the number of times of retreading performed in the past is stored in the memory 67 of the tire 1, the number of times of retreading may be included in the state data. In this case, the state determination processing portion 113 calculates the evaluation value S by taking into consideration the number of times of retreading. For example, in a case where the tire 1 is a retreaded tire and the number of times of retreading in the past is stored in the memory 67, the evaluation value S may be calculated by setting a weight coefficient corresponding to the number of times and multiplying the weight coefficient by the sum total of each numerical value $x_k$ of the right side of the formula (1). It is considered that the more the number of times of retreading is, the larger the load applied to the tire 1 is, and the base body portion is more easily deteriorated. As a result, in this case, the weight coefficient is set to a numerical value larger than 1 (one) that is determined in correspondence with the number of times of retreading.

In addition, other than the information of the above-mentioned each numerical value $x_k$, for example, road surface information that indicates the state of a travel road surface (road surface state) on which the vehicle 50 travels, the weather during traveling, the temperature during traveling, or the load applied to the tire 1 during traveling, may be included in the state data.

The road surface information is an index indicating a degree of unevenness of the road surface that may exert influence on the wear of the tread portion of the tire 1. The state of the road surface on which the vehicle 50 travels is varied and is different depending on the pavement construction method. For example, the material of pavement constructed on the road surface includes asphalt, concrete, concrete blocks, tiles, natural stones, crushed stones, wood chips, wood lumps, and earth. These materials that are different in quality have different influences on the wear of the tread portion. In addition, even pavement materials of the same kind are different in grain size depending on the various objectives or purposes, have different mixtures added, and have different influences on the wear of the tread portion. For example, it is considered that the higher the degree of unevenness of the road surface is, the more easily the tread portion wears, and the more easily the base body portion is deteriorated. On the other hand, it is considered that the lower the degree of unevenness of the road surface is, the more hardly the tread portion wears, and the more hardly the base body portion is deteriorated. The road surface information may be obtained by the control portion 11 based on an image of the road surface picked up by a camera installed on the vehicle 50. For example, the control portion 11 can obtain the road surface information by determining a state of road surface on which the vehicle is travelling by performing image processing on the image of the road surface, and selecting an index corresponding to the determined state of road surface from a plurality of predetermined indices included in table data respectively in correspondence with various types of states of road surface.

With regard to the weather or the temperature during travelling, weather information or temperature information of a position at which the vehicle is travelling can be acquired from a predetermined web site via the Internet. For example, it is considered that the better the weather is, the more amount of ultraviolet reaches the ground, and the radiation of ultraviolet causes the base body portion to be deteriorated more easily; and that the worse the weather is, the less amount of ultraviolet reaches the ground, and the deterioration of the base body portion by the radiation of ultraviolet is restricted. In addition, it is considered that the higher the temperature is, the more easily the temperature of the tire 1 increases, the more easily the wear is promoted, and the more easily the base body portion is deteriorated; and that the lower the temperature is, the more hardly the temperature of the tire 1 increases, the more hardly the wear is promoted, and the more hardly the base body portion is deteriorated In addition, with regard to the load applied to the tire 1, for example, a distortion sensor may be installed on the inner space surface of the tire 1, a contact area may be measured, based on an output signal of the distortion sensor, from a time (contact time) that is a time period from when the distortion sensor touches the ground to when it is separated from the ground, and the load may be estimated based on the contact area, the air pressure, and the weight of the vehicle 50. For example, it is considered that the larger the load is, the more easily the base body portion is deteriorated, and that the smaller the load is, the more hardly the base body portion is deteriorated.

In addition, in a case where the manufacturing year/month/day of the tire 1 is stored in the memory 67, the number of years elapsed between the time when the tire 1 was manufactured and the current time may be included in the state data, and the evaluation value S may be calculated by using the calculation formula of the formula (1). That is, a weight coefficient corresponding to the number of elapsed years may be set and the evaluation value S may be calculated by using the weight coefficient in the formula (1). In addition, when there is an error between the moving distance calculated from the position information of the GPS receiving portion 64 and the moving distance calculated from the rotation speed of the tire 1, it is considered that the larger the error is, the smaller the outer diameter size of the tire 1 during travelling is than a predefined size, and there is a possibility that the tire 1 is damaged. For this reason, the error may be included in the state data and the evaluation value S may be calculated by using the calculation formula of the formula (1). That is, a weight coefficient corresponding to the error may be set, and the evaluation value S may be calculated by using the weight coefficient in the formula (1).

In addition, in the above-described embodiment, an example is described in which the state data including various types of information that may exert influence on the deterioration of the base body portion of the tire 1 is acquired, and the evaluation value S that indicates the state of the base body portion is calculated based on the state data. However, not limited to this, for example, the evaluation value S may be calculated by adding each element such as: a profile of the tire 1 that is the determination object (information indicating the profile of the tire 1); a tire structure; a tread pattern; and information of materials of the tire 1 and a blend of each material. In addition, the evaluation value S may be calculated by adding a driving system (FF, FR, 4WD, etc.) of the vehicle 50. In addition, the evaluation value S may be calculated by adding an adjustment value of the wheel alignment. Specifically, a weight coefficient may be defined in correspondence with each of the above-mentioned elements, and the evaluation value S may be calculated by using the weight coefficient in the formula (1). In addition, information indicating each of the above-mentioned elements, numerical values, the weight coefficients and the like are preliminarily stored in the memory 67 installed in the tire 1 or the storage portion 12 of the state determination apparatus 10.

It is noted that the above-described embodiment shows an example configuration where the state data acquisition portion 111, the recording processing portion 112, the state determination processing portion 113, the applicability determination portion 114, the value determination portion 116, and the output processing portion 115 are realized by the control portion 11 of the state determination apparatus 10. However, a part or all of these processing portions may be realized by the control portion 61 of the control unit 60 of the vehicle 50, a processor in a vehicle-mounted terminal installed in the vehicle 50, or a control portion of the information terminal 20. That is, the process of each step of the flowchart shown in FIG. 5 may be executed by any of the state determination apparatus 10, the vehicle 50, and the information terminal 20. In addition, the conversion processing portion 611 realized by the control portion 61 of the control unit 60 may be realized by the control portion 11 of the state determination apparatus 10 or the control portion of the information terminal 20.

In addition, in the above-described embodiment, a processing example is described in which the state of the base body portion of the tire 1 attached to the vehicle 50 is determined, and the applicability of the tire 1 to a base tire is determined. However, the present disclosure is not limited to this configuration. For example, even when a tire 1 removed from the vehicle 50 is brought to an inspection site, the evaluation value S can be calculated as the state of the tire 1, and the applicability to a base tire or the value, too, can be determined. In this case, it is preferable that the memory 67 installed in the tire 1 is a storage device for reading and writing by a noncontact system corresponding to RFID or the like, and the communication apparatus 40 is a reader/writer that can communicate with the storage device. This makes it possible for the communication apparatus 40 to read the identification information and the state data in the memory 67, and the state determination apparatus 10 introduced into the inspection site can execute each of the above-described processes.

It is noted that the calculation example in which the evaluation value S is calculated by using the calculation formula of the formula (1) is only an example. The following describes other processing examples of the state determination process performed by the state determination processing portion 113. The state determination processing portion 113 may obtain an evaluation value of the tire 1 by using a determination model constructed based on teacher data preliminarily prepared. Here, the teacher data is information used to generate the determination model and is stored in a storage area assigned in the database 30. In addition, the determination model is stored in the storage portion 12 of the state determination apparatus 10.

The teacher data is a data set that includes, for each of a large number of used tires 1 (used tires): a numerical value of the state data having a causal relation with a crack or a damage of the tire 1; and an evaluation point given by an inspector to a result of a conventional inspection performed by the inspector.

The determination model is a learnt model that is used in the state determination process performed by the state determination processing portion 113 and calculates an evaluation value that indicates the state of the base body portion of the tire 1 that is the determination object. When the state data of the tire 1 has been input to an input portion, the determination model determines the evaluation value indicating the state of the base body portion, and outputs the evaluation value from an output portion. It is noted that the determination model is generated by a machine learning performed by the control portion 11, based on the teacher data stored in the database 30 and a predetermined algorithm.

When the evaluation value is calculated by using the determination model, the state data may include, for example, history information of detection values detected by the sensors 51 to 58 while the vehicle 50 was travelling, namely: history data of the rotation speed of the tire 1; history data of the lateral-direction acceleration; history data of the air pressure of the tire 1; history data of the temperature of the tire 1; history data of the wear amount of the tread portion; history data of the steering angle; and history data of the step amount of the brake. In addition, various types of history data such as history data of the travel position measured by the GPS receiving portion 64 and history data of the travel speed and acceleration of the vehicle 50, retreading history, the number of years elapsed from the time when the tire 1 was manufactured, and information of the manufacturing maker, may be applied.

Calculating the evaluation value by using the above-described determination model allows the accuracy of the evaluation value to improve, thereby further improving the accuracy of the determination process performed by the applicability determination portion 114.

The embodiments of the present disclosure described above include the following disclosure items (1) to (13).

Disclosure item (1) is a tire state determination system configured to determine a state of a base body portion of a tire that is used for travelling of a vehicle, the base body portion corresponding to a base tire. The tire state determination system includes an acquisition portion configured to acquire tire-related information that may exert influence on deterioration of the base body portion, and a state determination portion configured to determine a state of the base body portion based on the tire-related information.

Since it is configured as described above, when an inspector uses the present tire state determination system to inspect the applicability to a base tire for retreading, the inspector can preliminarily grasp the state of the base body portion of the tire as a material for determining whether it can be used as the base tire, before the inspector performs a primary inspection such as a visual inspection or a touch inspection, and a secondary inspection such as a high-voltage inspection or a shearography inspection. This makes it possible for the inspector to remove the tire in an inferior state from the inspection object, thereby reducing the load on the inspection and restricting a wasteful inspection cost.

In addition, when an owner of the vehicle uses the present tire state determination system, the owner can preliminarily grasp the state of the base body portion of the tire attached to the vehicle.

Disclosure item (2) is the tire state determination system according to the disclosure item (1), wherein the tire-related information is at least one or more of an air pressure of the tire, a temperature of the tire, a number of rotations of the tire, an acceleration at the tire, a frequency of occurrence of an acceleration exceeding a predetermined numerical value to the tire, a wear amount of the tire, a travel speed of the vehicle, an acceleration of the vehicle, a steering angle of the vehicle, a number of times of braking, an operation amount of braking, a travel route of the vehicle, a travel distance of the vehicle, road surface information indicating a state of a travel road surface, a weather during traveling, a temperature during traveling, a load applied to the tire during traveling, and a number of times of retreading.

In a case where the tire-related information includes the above-described plurality of pieces of information, the accuracy of determination by the state determination portion can be improved.

Disclosure item (3) is the tire state determination system according to the disclosure item (2), wherein the acquisition portion acquires a degree of uneven wear of the tire. In this case, the state determination portion determines the state of the base body portion based on the degree of the uneven wear.

As described above, since the state of the base body portion is determined by taking into consideration the degree of the uneven wear, the accuracy of determination by the state determination portion can be further improved.

Disclosure item (4) is the tire state determination system according to the disclosure item (2) or (3), wherein the acquisition portion acquires the travel distance for each type of the travel route. In this case, the state determination portion determines the state of the base body portion based on the travel distance for each type of the travel route.

As described above, since the state of the base body portion is determined by taking into consideration the travel distance for each type of the travel route, the accuracy of determination by the state determination portion can be further improved.

Disclosure item (5) is the tire state determination system according to any one of the disclosure items (1) to (4), further including a first determination portion configured to determine whether or not the base body portion is applicable to the base tire, based on a determination result of the state determination portion.

This eliminates the need for the user using the present tire state determination system to determine, by him/herself, the applicability to the base tire.

Disclosure item (6) is the tire state determination system according to the disclosure item (5), wherein the state determination portion calculates, as the determination result, an evaluation value indicating the state of the base body portion, based on the tire-related information. In this case, the first determination portion determines that the base body portion is applicable to the base tire when the evaluation value is equal to or higher than a predetermined threshold, and determines that the base body portion is not applicable to the base tire when the evaluation value is lower than the threshold.

Disclosure item (7) is the tire state determination system according to the disclosure item (6), wherein the tire includes a storage portion storing identification information of the tire. In this case, the acquisition portion acquires the tire-related information together with the identification information, and the state determination portion calculates the evaluation value of the tire corresponding to the identification information.

Disclosure item (8) is the tire state determination system according to the disclosure item (7), further including a recording portion configured to perform a process to record the tire-related information onto a predetermined storage medium in association with the identification information.

With the above-described configuration, for example, even when the tire is removed from the vehicle, is attached to another vehicle as a used tire, and is used in succession, the tire-related information of the tire as attached to the previous vehicle can be retained. Accordingly, even when the present tire is used in the next vehicle, the tire-related information as used in the previous vehicle can be handed over.

Disclosure item (9) is the tire state determination system according to any one of the disclosure items (5) to (8), further including a second determination portion configured to, when the first determination portion has determined that the base body portion is applicable to the base tire, determine a value of the tire as the base tire based on the determination result of the state determination portion.

The value is, for example, a market value as a base tire, such as a buying price or a selling price, or an index corresponding to the price information. Since the value is determined in the above-described manner, for example, value information indicating the value may be presented to a concerned person (for example, an owner of the tire or a sales intermediary) so that the concerned person can easily grasp an objective value as a base tire of the tire.

Disclosure item (10) is the tire state determination system according to any one of the disclosure items (1) to (9), further including an output processing portion configured to perform a process to output the determination result of the state determination portion or a calculation result of a calculation performed based on the determination result. For example, the output processing portion outputs the determination result, the determination result of the first determination portion, and the determination result of the second determination portion to a terminal apparatus or a display device in the present tire state determination system, or to an external apparatus or an external system that are connected to the present tire state determination system by a communication network.

Disclosure item (11) is a tire state determination apparatus configured to determine a state of a base body portion of a tire that is used for travelling of a vehicle, the base body portion corresponding to a base tire. The tire state determination apparatus includes an acquisition portion configured to acquire tire-related information that may exert influence on deterioration of the base body portion, and a state determination portion configured to determine a state of the base body portion based on the tire-related information.

Disclosure item (12) is a tire state determination method for determining a state of a base body portion of a tire that is used for travelling of a vehicle, the base body portion corresponding to a base tire. The tire state determination method includes an acquisition step of acquiring tire-related information that may exert influence on deterioration of the base body portion, and a state determination step of determining a state of the base body portion based on the tire-related information.

Disclosure item (13) is a program for determining a state of a base body portion of a tire that is used for travelling of a vehicle, the base body portion corresponding to a base tire, and is a program that causes one or more processors to execute each step of the tire state determination method, or a computer-readable recording medium on which such a program has been recorded in a non-transitory manner. The program is a program for causing one or more processors to execute: an acquisition step of acquiring tire-related information that may exert influence on deterioration of the base body portion; and a state determination step of determining a state of the base body portion based on the tire-related information.

What is claimed is:

1. A tire state determination system for determining a current state of a base body portion of a tire that is used for travelling of a vehicle, the base body portion corresponding to a base tire, the tire state determination system comprising a processor or circuit configured to function as:

an acquisition portion configured to acquire tire-related information that is capable of exerting influence on deterioration of the base body portion; and a state determination portion configured to determine the current state of the base body portion based on the tire-related information, wherein the acquisition portion is configured to acquire a degree of uneven wear of the tire, the state determination portion is configured to determine the current state of the base body portion based on the degree of the uneven wear, the determined current state of the base body portion indicates deterioration amount in the form of peeling, cracking, or damage to the base body portion of the tire, and the state determination portion includes an evaluation value calculation portion configured to calculate an evaluation value indicative of the state of the base body portion according to the following formula (1) using the above-mentioned each numerical value of the state data:

$$S = S_0 \cdot h \cdot \underset{k=1}{\overset{12}{\text{Math}}} \cdot t_k X_k, \tag{1}$$

where S denotes the evaluation value, $X_1$ denotes a tire rotation number, $X_2$ denotes an average speed, $X_3$ denotes a number of times of occurrence of excessive acceleration, $X_4$ denotes a number of times of occurrence of excessive lateral direction acceleration, $X_5$ denotes an inverse value of an average air pressure, $X_6$ denotes an average temperature, $X_7$ denotes a wear amount, $X_8$ denotes an uneven wear amount, $X_9$ denotes a number of times of occurrence of excessive steering angle, $X_{10}$ denotes a number of times of braking, $X_{11}$ denotes a number of times of occurrence of an excessive step amount, $X_{12}$ denotes an inverse value of a groove depth of the tire, and $S_0$ denotes a reference evaluation value, and where the coefficient $t_k$ ($t_1$, $t_2$, $t_3$, . . . , $t_{12}$) is a weight coefficient assigned to each value $X_k$ ($t_1$, $t_2$, $t_3$, . . . , $t_{12}$), and the coefficient h is a weight coefficient applicable in correspondence with a travel distance.

2. The tire state determination system according to claim 1, wherein the tire-related information is at least one or more of an air pressure of the tire, a temperature of the tire, a number of rotations of the tire, an acceleration at the tire, a frequency of occurrence of an acceleration exceeding a predetermined numerical value to the tire, a wear amount of the tire, a travel speed of the vehicle, an acceleration of the vehicle, a steering angle of the vehicle, a number of times of braking, an operation amount of braking, a travel route of the vehicle, the travel distance of the vehicle, road surface information indicating a state of a travel road surface, a weather during traveling, a temperature during traveling, a load applied to the tire during traveling, and a number of times of retreading.

3. The tire state determination system according to claim 2, wherein the acquisition portion acquires the travel distance for each type of the travel route, and the state determination portion determines the current state of the base body portion based on the travel distance for each type of the travel route.

4. The tire state determination system according to claim 1, wherein the processor or circuit is configured to function as a first determination portion configured to determine whether or not the base body portion is applicable to the base tire, based on a determination result of the state determination portion regarding the current state of the base body portion.

5. The tire state determination system according to claim 4, wherein the state determination portion calculates, as the determination result, the evaluation value indicating the current state of the base body portion, based on the tire-related information, and the first determination portion determines that the base body portion is applicable to the base tire under a first condition where the evaluation value is equal to or higher than a predetermined threshold, and determines that the base body portion is not applicable to the base tire under a second condition where the evaluation value is lower than the predetermined threshold.

6. The tire state determination system according to claim 5, wherein the tire includes a storage portion storing identification information of the tire, the acquisition portion acquires the tire-related information together with the identification information, and the state determination portion calculates the evaluation value of the tire corresponding to the identification information.

7. The tire state determination system according to claim 6, wherein the processor or circuit is configured to function as a recording portion configured to perform a process to record the tire-related information onto a predetermined storage medium in association with the identification information.

8. The tire state determination system according to claim 4, wherein the processor or circuit is configured to function as a second determination portion configured to, under a condition where the first determination portion has determined that the base body portion is applicable to the base tire, determine a value of the tire as the base tire based on the determination result of the state determination portion.

9. The tire state determination system according to claim 1, wherein the processor or circuit is configured to function as an output processing portion configured to perform a process to output the determination result of the state determination portion or a calculation result of a calculation performed based on the determination result.

10. A tire state determination apparatus for determining a current state of a base body portion of a tire that is used for travelling of a vehicle, the base body portion corresponding to a base tire, the tire state determination apparatus comprising:

an acquisition portion configured to acquire tire-related information that is capable of exerting influence on deterioration of the base body portion; and a state determination portion configured to determine the current state of the base body portion based on the tire-related information, wherein the acquisition portion is configured to acquire a degree of uneven wear of the tire, the state determination portion is configured to determine the current state of the base body portion based on the degree of the uneven wear, and the state determination portion includes an evaluation value calculation portion configured to calculate an evaluation value indicative of the state of the base body portion according to the following formula (1) using the above-mentioned each numerical value of the state data:

$$S = S_0 \cdot h \cdot \underset{k=1}{\overset{12}{\text{Math}}} \cdot t_k X_k, \tag{1}$$

where S denotes the evaluation value, $X_1$ denotes a tire rotation number, $X_2$ denotes an average speed, $X_3$ denotes a number of times of occurrence of excessive acceleration, $X_4$ denotes a number of times of occurrence of excessive lateral direction acceleration, $X_5$ denotes an inverse value of an average air pressure, $X_6$ denotes an average temperature, $X_7$ denotes a wear amount, $X_8$ denotes an uneven wear amount, $X_9$ denotes a number of times of occurrence of excessive steering angle, $X_{10}$ denotes a number of times of braking, $X_{11}$ denotes a number of times of occurrence of an excessive step amount, $X_{12}$ denotes an inverse value of a groove depth of the tire, and $S_0$ denotes a reference evaluation value, and where the coefficient $t_k$ ($t_1$, $t_2$, $t_3$, . . . , $t_{12}$) is a weight coefficient assigned to each value $X_k$ ($t_1$, $t_2$, $t_3$, . . . , $t_{12}$), and the coefficient h is a weight coefficient applicable in correspondence with a travel distance.

11. A tire state determination method for determining a current state of a base body portion of a tire that is used for travelling of a vehicle, the base body portion corresponding to a base tire, the tire state determination method comprising:

an acquisition step of acquiring tire-related information that is capable of exerting influence on deterioration of the base body portion; and a state determination step of determining the current state of the base body portion based on the tire-related information, wherein the acquisition step acquires a degree of uneven wear of the tire, the state determination step determines the current state of the base body portion based on the degree of the uneven wear, the determined current state of the base body portion indicates deterioration amount in the form of peeling, cracking, or damage to the base body portion of the tire, and the state determination portion includes an evaluation value calculation portion configured to calculate an evaluation value indicative of the state of the base body portion according to the following formula (1) using the above-mentioned each numerical value of the state data:

$$S = S_0 \cdot h \cdot \underset{k=1}{\overset{12}{\text{Math}}} \cdot t_k X_k, \tag{1}$$

where S denotes the evaluation value, $X_1$ denotes a tire rotation number, $X_2$ denotes an average speed, $X_3$ denotes a number of times of occurrence of excessive acceleration, $X_4$ denotes a number of times of occurrence of excessive lateral direction acceleration, $X_5$ denotes an inverse value of an average air pressure, $X_6$ denotes an average temperature, $X_7$ denotes a wear amount, $X_8$ denotes an uneven wear amount, $X_9$ denotes a number of times of occurrence of excessive steering angle, $X_{10}$ denotes a number of times of braking, $X_{11}$ denotes a number of times of occurrence of an excessive step amount, $X_{12}$ denotes an inverse value of a groove depth of the tire, and $S_0$ denotes a reference evaluation value, and where the coefficient $t_k$ ($t_1$, $t_2$, $t_3$, . . . , $t_{12}$) is a weight coefficient assigned to each value $X_k$ ($t_1$, $t_2$, $t_3$, . . . , $t_{12}$), and the coefficient h is a weight coefficient applicable in correspondence with a travel distance.

12. A non-transitory computer-readable storage medium containing a program for determining a current state of a base body portion of a tire that is used for travelling of a vehicle, the base body portion corresponding to a base tire, the program causing one or more processors to execute:

an acquisition step of acquiring tire-related information that is capable of exerting influence on deterioration of the base body portion; and a state determination step of determining the current state of the base body portion based on the tire-related information, wherein the acquisition step acquires a degree of uneven wear of the tire, the state determination step determines the current state of the base body portion based on the degree of the uneven wear, the state determination portion includes an evaluation value calculation portion configured to calculate an evaluation value indicative of the state of the base body portion according to the following formula (1) using the above-mentioned each numerical value of the state data:

$$S = S_0 \cdot h \cdot \underset{k=1}{\overset{12}{\text{Math}}} \cdot t_k X_k, \tag{1}$$

where S denotes the evaluation value, $X_1$ denotes a tire rotation number, $X_2$ denotes an average speed, $X_3$ denotes a number of times of occurrence of excessive acceleration, $X_4$ denotes a number of times of occurrence of excessive lateral direction acceleration, $X_5$ denotes an inverse value of an average air pressure, $X_6$ denotes an average temperature, $X_7$ denotes a wear amount, $X_8$ denotes an uneven wear amount, $X_9$ denotes a number of times of occurrence of excessive steering angle, $X_{10}$ denotes a number of times of braking, $X_{11}$ denotes a number of times of occurrence of an excessive step amount, $X_{12}$ denotes an inverse value of a groove depth of the tire, and $S_0$ denotes a reference evaluation value, and where the coefficient $t_k$ ($t_1$, $t_2$, $t_3$, . . . , $t_{12}$) is a weight coefficient assigned to each value $X_k$ ($t_1$, $t_2$, $t_3$, . . . , $t_{12}$), and the coefficient h is a weight coefficient applicable in correspondence with a travel distance.

* * * * *